United States Patent
Kosaka et al.

(10) Patent No.: US 9,534,271 B2
(45) Date of Patent: Jan. 3, 2017

(54) HOT ROLLED STEEL SHEET AND METHOD FOR MANUFACTURING THE SAME

(71) Applicant: JFE Steel Corporation, Tokyo (JP)

(72) Inventors: Noriaki Kosaka, Tokyo (JP);
Yoshimasa Funakawa, Tokyo (JP);
Masato Shigemi, Tokyo (JP);
Hidekazu Ookubo, Tokyo (JP);
Tokunori Kanemura, Tokyo (JP)

(73) Assignee: JFE Steel Corporation (JP)

( * ) Notice: Subject to any disclaimer, the term of this patent is extended or adjusted under 35 U.S.C. 154(b) by 247 days.

(21) Appl. No.: 14/365,392

(22) PCT Filed: Dec. 25, 2012

(86) PCT No.: PCT/JP2012/008239
§ 371 (c)(1),
(2) Date: Jun. 13, 2014

(87) PCT Pub. No.: WO2013/099206
PCT Pub. Date: Jul. 4, 2013

(65) Prior Publication Data
US 2015/0030879 A1   Jan. 29, 2015

(30) Foreign Application Priority Data
Dec. 27, 2011   (JP) ................. 2011-285774

(51) Int. Cl.
| | | |
|---|---|---|
| *C21D 8/02* | (2006.01) | |
| *C22C 38/02* | (2006.01) | |
| *C22C 38/16* | (2006.01) | |
| *C22C 38/04* | (2006.01) | |
| *C22C 38/14* | (2006.01) | |
| *C21D 9/46* | (2006.01) | |
| *C22C 38/60* | (2006.01) | |
| *C22C 38/00* | (2006.01) | |
| *C22C 38/06* | (2006.01) | |
| *C22C 38/12* | (2006.01) | |
| *B32B 15/01* | (2006.01) | |
| *C22C 38/10* | (2006.01) | |
| *C22C 38/42* | (2006.01) | |
| *C22C 38/48* | (2006.01) | |
| *C22C 38/50* | (2006.01) | |
| *C22C 38/54* | (2006.01) | |

(52) U.S. Cl.
CPC ............. *C21D 8/0263* (2013.01); *B32B 15/01* (2013.01); *C21D 8/0226* (2013.01); *C21D 9/46* (2013.01); *C22C 38/001* (2013.01); *C22C 38/002* (2013.01); *C22C 38/005* (2013.01); *C22C 38/007* (2013.01); *C22C 38/008* (2013.01); *C22C 38/02* (2013.01); *C22C 38/04* (2013.01); *C22C 38/06* (2013.01); *C22C 38/10* (2013.01); *C22C 38/12* (2013.01); *C22C 38/14* (2013.01); *C22C 38/42* (2013.01); *C22C 38/48* (2013.01); *C22C 38/50* (2013.01); *C22C 38/54* (2013.01); *C22C 38/60* (2013.01); *C21D 2211/005* (2013.01); *Y10T 428/12799* (2015.01)

(58) Field of Classification Search
None
See application file for complete search history.

(56) References Cited

FOREIGN PATENT DOCUMENTS

| | | |
|---|---|---|
| EP | 0 535 238 | 4/1993 |
| EP | 1 028 167 | 8/2000 |
| EP | 1 636 392 | 3/2006 |
| EP | 1 918 396 | 5/2008 |
| EP | 1 978 121 | 10/2008 |
| EP | 2 692 894 | 2/2014 |
| JP | 02-008349 A | 1/1990 |
| JP | 05-271865 A | 10/1993 |
| JP | 2000-199034 | 7/2000 |
| JP | 2002-105595 A | 4/2002 |
| JP | 2003-089848 A | 3/2003 |
| JP | 2003-138343 A | 5/2003 |
| JP | 2006-124789 A | 5/2006 |
| JP | 2006-161111 A | 6/2006 |
| JP | 2007-270197 * 10/2007 ............. C22C 38/00 |
| JP | 2007-302992 A | 11/2007 |
| JP | 2008-179852 A | 8/2008 |
| JP | 2011-026690 A | 2/2011 |

OTHER PUBLICATIONS

Machine-English translation of Japanese patent No. 2007-270197, Yoshida Mitsuru et al, Oct. 18, 2007.*
Supplementary European Search Report dated Dec. 2, 2014 from corresponding European Patent Application No. 12 86 3298.

* cited by examiner

Primary Examiner — Deborah Yee
(74) Attorney, Agent, or Firm — DLA Piper LLP (US)

(57) ABSTRACT

A semi-manufactured steel material has a chemical composition including, by mass %, C: 0.055% to 0.15%, Si: not more than 0.2%, Mn: not more than 1.3%, P: not more than 0.03%, S: not more than 0.007%, Al: not more than 0.1%, N: not more than 0.01%, and Ti: 0.14% to 0.30%, the balance comprising Fe and inevitable impurities. In the composition, $1.0 \leq ([C]/12)/([Ti^*]/48)$ is satisfied ([C], [S], [N] and [Ti]: contents (mass %) of the respective elements, and $[Ti^*] = [Ti]-3.4\times[N]-1.5\times[S]$), and the contents of niobium and boron as impurities are limited to Nb: less than 0.03% and B: less than 0.0005%.

21 Claims, No Drawings

HOT ROLLED STEEL SHEET AND METHOD FOR MANUFACTURING THE SAME

TECHNICAL FIELD

This disclosure relates to high strength hot rolled steel sheets useful in automobile part applications having a tensile strength (TS) of not less than 850 MPa and a small anisotropy in mechanical properties, and to methods of manufacturing such steel sheets. The anisotropy in mechanical properties indicates a difference in mechanical properties of a hot rolled steel sheet between in an L direction (a rolling direction) and in a C direction (a direction perpendicular to the rolling direction).

BACKGROUND

From the viewpoint of global environment preservation, the automobile industry is recently oriented to improving the fuel efficiency of automobiles to meet $CO_2$ emissions regulations. Because automobile fuel efficiency is enhanced most effectively by reducing the weight of automobiles through thinning of parts, high strength hot rolled steel sheets are increasingly used as automobile part materials. On the other hand, as many of automobile steel parts are produced by press forming, steel sheets for automobile parts are required to exhibit excellent press formability in addition to high strength.

However, increasing the strength of steel sheets tends to increase the anisotropy in mechanical properties. Consequently, steel sheets strengthened to a tensile strength of not less than 850 MPa have a marked anisotropy in mechanical properties. Due to this anisotropy, problems are encountered such as unexpected occurrence of cracks during press forming and a failure of the press-formed articles to attain desired properties such as impact resistance depending on the direction in which a press load has been applied.

For the reasons described above, application of high strength hot rolled steel sheets with a tensile strength of not less than 850 MPa to automobile parts and the like entails the development of a technique realizing stable industrial-scale production of high strength hot rolled steel sheets with a low anisotropy in mechanical properties.

A variety of techniques have been proposed with respect to high strength steel sheets for automobile parts.

For example, Japanese Unexamined Patent Application Publication No. 2011-026690 proposes a technique in which the chemical composition of a steel sheet includes, by mass %, C: 0.02 to 0.08%, Si: 0.01 to 1.50%, Mn: 0.1 to 1.5%, Ti: 0.03 to 0.06%, P: not more than 0.1%, S: not more than 0.005%, Al: not more than 0.5%, N: not more than 0.009%, and a total of Nb, Mo and V: not more than 0.01%, the balance being Fe and inevitable impurities, the ratio Ti/C of the Ti content to the C content being 0.375 to 1.6, and in which TiC precipitate in crystal grains has an average diameter of 0.8 to 3 nm and an average numerical density of not less than $1 \times 10^{17}$ [particles/cm$^3$]. According to the technique proposed in JP '690, titanium having the highest carbide-forming ability is effectively utilized in precipitation strengthening and consequently alloy-saving high strength hot rolled steel sheets are obtained which are prevented from a decrease in workability due to the addition of alloy elements and have a tensile strength of 540 to 650 MPa.

Japanese Unexamined Patent Application Publication No. 2007-302992 proposes a technique in which the chemical composition of the steel sheet includes, by mass %, C: 0.015 to 0.06%, Si: less than 0.5%, Mn: 0.1 to 2.5%, P≤0.10%, S≤0.01%, Al: 0.005 to 0.3%, N≤0.01%, Ti: 0.01 to 0.30% and B: 2 to 50 ppm, the balance being Fe and inevitable impurities, the atomic ratio of carbon to carbide-forming elements is controlled to a specific value, the contents of silicon, manganese, boron and molybdenum, which are elements controlling the γ/α transformation temperature of steel, are specified to satisfy a predetermined relationship, and the microstructure of a steel sheet is configured such that the area percentage of one or both of ferrite and bainitic ferrite is not less than 90%, and the area percentage of cementite is not more than 5%. According to the technique proposed in JP '992, addition of boron remedies a decrease in grain boundary strength caused by carbide precipitation to control the occurrence of defects at burrs. Consequently, it is allegedly possible to inexpensively and stably manufacture high strength hot rolled steel sheets with a tensile strength of not less than 690 MPa which exhibit excellent stretch flangeability as well as have high crack resistance in blanking and good surface condition.

Japanese Unexamined Patent Application Publication No. 2002-105595 proposes a technique in which the basic chemical composition of a steel sheet includes, by mass %, C: 0.01 to 0.10%, Si: not more than 1.0%, Mn: not more than 2.5%, P: not more than 0.08%, S: not more than 0.005%, Al: 0.015 to 0.050% and Ti: 0.10 to 0.30%, the balance being Fe, and the microstructure of the steel sheet is configured such that the main phase is ferrite, the unit grains are grains surrounded by adjacent grains each with an orientation difference of not less than 15°, and the average unit grain diameter thereof, d μm, is not more than 5 μm. Further, JP '595 proposes a method of manufacturing high strength hot rolled steel sheets in which steel having the above chemical composition is heated, rolled, cooled and coiled such that finish rolling is performed at a temperature of 900 to 840° C. and the reduction ratio in the finish rolling is not less than 70%. According to the techniques proposed in JP '595, high strength hot rolled steel sheets with excellent stretch flangeability are allegedly obtained by controlling the diameter and configuration of ferrite grains.

Japanese Unexamined Patent Application Publication No. 2-008349 proposes a technique in which the chemical composition of a hot rolled steel strip includes C: 0.04 to 0.18 wt %, Si: 0.05 to 1.00 wt %, Mn: 0.10 to 0.50 wt %, Ti: 0.05 to 0.30 wt %, Al: 0.001 to 0.100 wt %, N: not more than 0.0100 wt %, P: not more than 0.030 wt % and S: not more than 0.015 wt % and satisfies 0.3≤Ti/(C+S+N)<5 and C+Mn/6+Si/24+Cr/5≤0.20 wt %, and the polygonal ferrite fraction in the final microstructure is not less than 70%. According to the technique proposed in JP '349, the Si and Mn contents are controlled to reduce the carbon equivalent weight which is an indicator of weldability, and further the prescribed amount of titanium as a strengthening component is added, thereby obtaining high tensile strength hot rolled steel strips having excellent weldability and a tensile strength of not less than 55 kgf/mm$^2$.

According to the technique proposed in JP '690, the Ti content is as low as 0.03 to 0.06% and consequently a sufficient amount of carbide (TiC) contributing to precipitation strengthening cannot be precipitated. As a result, the tensile strength of the obtainable steel sheets is only about 650 MPa. Increasing the Ti content in an attempt to increase the strength tends to result in the coarsening of TiC precipitated, and thus high strength exceeding 650 MPa cannot be easily achieved. In the technique proposed in JP '690, the carbide (TiC) is prone to be coarsened when the Ti content exceeds 0.06%. Thus, it is extremely difficult with that technique to increase the tensile strength of steel sheets to 850 MPa or more.

The technique proposed in JP '992 increases the strength of steel sheets by adding boron to the steel sheets as well as by adding manganese which is a solid solution strengthening element and is also an element that controls the precipitation of carbide contributing to precipitation strengthening. However, this technique involves addition of at least 10 ppm boron as illustrated in the Examples. Since boron significantly inhibits austenite recrystallization as will be described later, that proposed technique involving as much as 10 ppm or more boron cannot avoid problems associated with the anisotropy in mechanical properties. While JP '992 discloses an Example in which a steel sheet contains 0.5% manganese, the tensile strength of this steel sheet is as low as less than 750 MPa. Further, the anisotropy in mechanical properties of that hot rolled steel sheet will be large because it contains 0.03% niobium which significantly retards austenite recrystallization. Further, the technique proposed in JP '992 specifies the chemical composition of the steel sheet such that the ratio of the C content to the Ti content is inappropriate and does not allow the steel sheet to achieve a tensile strength of 850 MPa or more.

The technique proposed in JP '595 increases the strength of steel sheets by addition of manganese which is a solid solution strengthening element as well as promotes transformation and affects grain boundary shapes. However, the technique proposed in JP '595 is insufficient in terms of the optimization of rolling conditions and, as illustrated in the Examples, only provides steel sheets with a tensile strength of less than 850 MPa even when solid solution strengthening elements silicon and manganese are added in 0.5% and 1.5%, respectively. Further, the problematic anisotropy in mechanical properties is encountered. While JP '595 discloses an Example in which a steel sheet contains 0.3% manganese, the tensile strength of this steel sheet is as low as 730 MPa. Further, the anisotropy in mechanical properties of that hot rolled steel sheet will be large because it contains as much as 0.24% niobium which significantly retards austenite recrystallization. Furthermore, similarly to the technique proposed in JP '992, the chemical composition of the steel sheet is specified such that the ratio of the C content to the Ti content is inappropriate and does not allow the steel sheet to achieve a tensile strength of 850 MPa or more.

The technique proposed in JP '349, as illustrated in the Examples, only provides hot rolled steel strips with a tensile strength of about 70 kgf/mm$^2$ when the Ti content is relatively low. Even when the ratio of the C content to the Ti content is appropriate, the tensile strength of the obtained hot rolled steel strips is still less than 850 MPa due to neglecting the austenite grain configurations. Further, JP '349 describes that the microstructure of the hot rolled steel strip is based on fine polygonal ferrite and homogenized to eliminate anisotropy. However, JP '690, JP '992, JP '595 and JP '349 does not disclose any specific parameters of the microstructure such as crystal grain diameters, and neglects the state of austenite grains. Thus, problems remain in the anisotropy of mechanical properties.

As discussed above, it is extremely difficult with conventional techniques to increase the tensile strength of hot rolled steel sheets to 850 MPa or more and simultaneously to avoid problems associated with the anisotropy in mechanical properties.

It could therefore be helpful to provide high strength hot rolled steel sheets having a tensile strength of not less than 850 MPa and a reduced anisotropy in mechanical properties evaluated in terms of tensile strength and total elongation, and to provide methods of manufacturing such steel sheets.

SUMMARY

We thus provide:

[1] A method of manufacturing hot rolled steel sheets, including subjecting a semi-manufactured steel material to heating, hot rolling including rough rolling and finish rolling, cooling after the completion of finish rolling, and coiling, thereby producing a hot rolled steel sheet, wherein
the semi-manufactured steel material has a chemical composition including, by mass %,
C: 0.055% to 0.15%, Si: not more than 0.2%,
Mn: not more than 1.3%, P: not more than 0.03%,
S: not more than 0.007%, Al: not more than 0.1%,
N: not more than 0.01%, and Ti: 0.14% to 0.30%,
the contents of carbon, sulfur, nitrogen and titanium satisfying the inequality (1) below, the contents of niobium and boron as impurities being limited to Nb: less than 0.03% and B: less than 0.0005%, the balance comprising Fe and inevitable impurities,
the heating is performed at a heating temperature T (° C.) of not less than 1150° C., the heating temperature satisfying the inequality (2) below, the semi-manufactured steel material being held at the temperature range of not less than 1150° C. for 15 minutes or more,
the hot rolling is performed with a total reduction ratio in a temperature range of 980° C. and below of not more than 40%,
the finish rolling is performed at a finish rolling temperature of not less than 880° C.,
the cooling is started within 3 seconds after the completion of finish rolling and is performed at an average cooling rate of 40° C./sec. to 200° C./sec, and
the coiling is performed at a coiling temperature of 500° C. to 680° C.,
wherein:

$$1.0 \leq ([C]/12)/([Ti]^*/48) \quad (1)$$

$$[Ti^*] < 10^{\{-7000/(T+273)+2.75\}}/[C] \quad (2)$$

$[Ti^*]=[Ti]-3.4\times[N]-1.5\times[S]$

T: heating temperature (° C.) for the semi-manufactured steel material ([C], [S], [N] and [Ti]: contents (mass %) of the respective elements).

[2] The method of manufacturing hot rolled steel sheets described in [1], wherein the chemical composition further includes, by mass %, V: not more than 0.30%.

[3] The method of manufacturing hot rolled steel sheets described in. [1], wherein the chemical composition further includes, by mass %, one or both of W: not more than 1.0% and Mo: not more than 0.5%.

[4] The method of manufacturing hot rolled steel sheets described in [2], wherein the chemical composition further includes, by mass %, one or both of W: not more than 1.0% and Mo: not more than 0.5%.

[5] The method of manufacturing hot rolled steel sheets described in any of [1] to [4], wherein the chemical composition further includes, by mass %, not more than 1.0% in total of one or more of Sb, Cu, Ni, Sn, Cr, Ca, REM, Mg, Se, Te, Po, As, Bi, Ge, Pb, Ga, In, Tl, Zn, Cd, Hg, Ag, Au, Pd, Pt, Co, Rh, Ir, Ru, Os, Tc, Re, Ta, Be and Sr.

[6] A hot rolled steel sheet with high strength manufactured by the method described in any of [1] to [5], the hot rolled steel sheet including a ferrite phase with an area percentage of not less than 95%, the ferrite phase having an average crystal grain diameter of not more than 8 μm, the crystal grains of the ferrite phase having an aspect ratio of not more than 3.5, the crystal grains of the ferrite phase having an average carbide particle diameter of less than 10 nm, the hot rolled steel sheet having a tensile strength of not less than 850 MPa.

[7] The hot rolled steel sheet described in [6], having a plating layer on the surface of the steel sheet.

[8] The hot rolled steel sheet described in [7], wherein the plating layer is a zinc coating.

[9] The hot rolled steel sheet described in [8], wherein the plating layer is an alloyed zinc coating.

[10] The hot rolled steel sheet described in any of [6] to [9], wherein the hot rolled steel sheet has an anisotropy in tensile strength of not more than 30 MPa,
the anisotropy in tensile strength being defined as a difference in absolute value obtained by subtracting the tensile strength in L direction from the tensile strength in C direction.

[11] The hot rolled steel sheet described in any of [6] to [10], wherein the hot rolled steel sheet has an anisotropy in total elongation of not more than 2%,
the anisotropy in total elongation being defined as a difference in absolute value obtained by subtracting the total elongation in L direction from the total elongation in C direction.

High strength hot rolled steel sheets may be obtained which have a tensile strength of not less than 850 MPa and a small anisotropy in mechanical properties and are suitable for applications such as automobile structural parts. Thus, marked effects are obtained such as weight reduction of automobile parts and efficient forming of automobile parts.

DETAILED DESCRIPTION

Hereinbelow, our steel sheets and methods will be described in detail.

We carried out extensive studies focusing on hot rolled steel sheets including a ferrite single phase microstructure which exhibit good workability such as press formability, and studied various factors that would affect strengthening and the occurrence of anisotropy in mechanical properties of the hot rolled steel sheets. As a result, we found that the shapes of ferrite grains have a large influence on the anisotropy in tensile strength and total elongation; that nearly equiaxial ferrite grains are of importance to reduce the anisotropy in these properties; and that the ferrite grains are effectively allowed to be nearly equiaxial grains by reducing the stored strain energy in austenite grains prior to the transformation, during the hot rolling step in the manufacturing of hot rolled steel sheets. Further, we found that to reduce the stored strain energy in austenite grains prior to the transformation, the hot rolling step should be performed such that the recrystallization of austenite grains is promoted while the reduction at low temperatures is controlled to be small. Furthermore, we found that minimally reducing the amounts of silicon, manganese and easily segregated elements boron and niobium is important to promote recrystallization of austenite grains.

Because manganese and silicon are solid solution strengthening elements, reduction in the contents of such elements as manganese inevitably causes a decrease in the strength of steel sheets. We then adopted carbide precipitation strengthening as an alternative strengthening mechanism to the solid solution strengthening with such elements as manganese. In detail, the fine precipitation of carbide in the ferrite phase that is the matrix of steel sheets has been adopted as an approach to achieving the desired strength of steel sheets (tensile strength: 850 MPa or more). Because greater effects in the strengthening of steel sheets are expected with increasing fineness and amount of the carbide precipitated in the ferrite phase, we searched for approaches that will allow fine carbide to be precipitated in a sufficient amount.

The precipitation of carbide in crystal grains in the ferrite phase usually occurs substantially simultaneously with the austenite to ferrite transformation of steel. Further, carbide tends to be coarsened when precipitated at high temperatures and will be precipitated as fine carbide at low temperatures. Based on these facts, fine carbide may be advantageously precipitated in crystal grains in the ferrite phase by adjusting, for example, the chemical composition of steel sheets and the rate of cooling after the completion of hot rolling to lower the austenite to ferrite transformation point of the steel to a coiling temperature range so that the steel sheets will be coiled immediately after the carbide is precipitated in crystal grains of the ferrite phase or so that austenite will be transformed into ferrite and the carbide will be precipitated in crystal grains of the ferrite phase at the same time as coiling.

As already mentioned, to reduce anisotropy in mechanical properties of hot rolled steel sheets, it is preferably to be controlled by reducing the amounts of manganese and boron present in the semi-manufactured steel material. On the other hand, manganese and boron retard the austenite to ferrite transformation of steel during cooling after the completion of hot rolling, and thereby lower the austenite to ferrite transformation point. Consequently, when the amounts of manganese and boron present in the semi-manufactured steel material are reduced for the purpose of controlling the occurrence of anisotropy in mechanical properties of hot rolled steel sheets, ferrite transformation is allowed to start at a high temperature during the course of cooling after completion of hot rolling. This results in the coarsening of carbide, and a failure to manufacture high strength steel sheets with a tensile strength of 850 MPa or more.

We then focused on carbon and titanium. In the manufacturing of hot rolled steel sheets, these elements retard the occurrence of austenite to ferrite transformation during cooling after completion of hot rolling. After the occurrence of austenite to ferrite transformation, they form carbide to significantly increase the strength of the hot rolled steel sheets. Based on this, we worked on increasing the strength of hot rolled steel sheets by precipitating fine titanium carbide in crystal grains of the ferrite phase. As a result, we found that the anisotropy in mechanical properties of hot rolled steel sheets may be reduced and fine titanium carbide may be precipitated in a large amount to fully exert precipitation strengthening, by reducing the Mn and Si contents or further the B and Nb contents in semi-manufactured steel material to or below specific amounts as well as by adjusting the C, Ti, N and S contents, and further by adjusting the heating temperature and the hot rolling conditions for the semi-manufactured steel material (steel slab) to be hot rolled in accordance with the contents of these elements.

The reasons why the chemical composition of semi-manufactured steel material is limited will be described. In the following description, the unit "%" indicates percentage by mass (mass %) of the component unless otherwise mentioned.

C: 0.055% to 0.15%

In the manufacturing of hot rolled steel sheets, carbon restrains the occurrence of austenite to ferrite transformation of steel during cooling after the completion of hot rolling, and thereby prevents precipitation and coarsening of carbide at high temperatures. Thus, carbon has an effect of reducing the size of carbide. After the occurrence of austenite to ferrite transformation, carbon bonds to titanium or further to tungsten, molybdenum and vanadium described later to form carbides which are finely dispersed in steel sheets. That is, carbon is an element that significantly strengthens the ferrite phase by forming fine carbides, and is essential for the strengthening of hot rolled steel sheets.

If the C content is less than 0.055%, the austenite to ferrite transformation of steel occurs at high temperatures during cooling after the completion of hot rolling, thus causing the coarsening of carbide. As a result, hot rolled steel sheets having the desired strength (tensile strength: 850 MPa or more) cannot be obtained. Further, any C content less than 0.055% does not allow carbides to be precipitated in sufficient amounts in crystal grains in the ferrite phase, resulting in a failure to obtain the desired steel sheet strength. Thus, the C content is limited to not less than 0.055%, and is preferably not less than 0.06%. If the C content exceeds 0.15%, coarse titanium carbide is formed in the semi-manufactured steel material. Such coarse titanium carbide cannot be solved completely when the semi-manufactured steel material is reheated in hot rolled steel sheet manufacturing steps. Consequently, the final hot rolled steel sheets will contain coarse titanium carbide. Coarse titanium carbide remaining in hot rolled steel sheets causes a markedly poor steel strength due to the corresponding decrease in the amount of fine titanium carbide precipitate responsible for strengthening. Further, the presence of coarse titanium carbide in semi-manufactured steel material inhibits recrystallization of austenite grains during hot rolling, resulting in a large anisotropy in mechanical properties of the hot rolled steel sheets. Thus, the C content is limited to not more than 0.15%, and is preferably not more than 0.13%.

Si: Not More than 0.2%

Silicon is an effective element in increasing the strength of steel sheets without causing a decrease in ductility (elongation), and is positively used in conventional high strength steel sheets. However, silicon inhibits recrystallization of austenite grains in a hot rolling step in the manufacturing of hot rolled steel sheets, and thus contributes to the occurrence of anisotropy in mechanical properties of the hot rolled steel sheets. It is therefore desirable that the Si content be lowered as much as possible. However, up to 0.2% silicon is acceptable, and thus the upper limit of the Si content is 0.2%. The Si content is preferably not more than 0.09%. Silicon may be eliminated to an impurity-level content, or may be eliminated to zero without any problems.

Mn: Not More than 1.3%

Manganese is a solid solution strengthening element and is positively used in conventional high strength steel sheets similarly to silicon. However, manganese inhibits recrystallization of austenite grains in a hot rolling step, and thus contributes to the occurrence of anisotropy in mechanical properties of the hot rolled steel sheets. It is therefore desirable that the Mn content be lowered as much as possible. However, up to 1.3% manganese is acceptable, and thus the upper limit of the Mn content is 1.3%. The Mn content is preferably less than 0.5%, in which case the anisotropy in mechanical properties is further remedied. Lowering the Mn content to an extremely low level raises the ferrite transformation temperature (transformation point), and the carbide will be exposed to high temperature when it is precipitated at the same time as the austenite to ferrite transformation during cooling after the completion of finish rolling in the manufacturing of hot rolled steel sheets. The carbide is coarsened quickly when exposed to such high temperatures, and the strength of the final hot rolled steel sheets is lowered. From this viewpoint, the Mn content is preferably not less than 0.1%.

P: Not More than 0.03%

During hot rolling, phosphorus is segregated at dislocations introduced in austenite grains to inhibit recrystallization and to contribute to the occurrence of anisotropy in mechanical properties of hot rolled steel sheets. It is therefore desirable that the P content be lowered as much as possible. However, up to 0.03% phosphorus is acceptable, and thus the P content is limited to not more than 0.03%. The P content is preferably not more than 0.02%. The P content may be zero without any problems.

S: Not More than 0.007%

Sulfur bonds to manganese to form soft sulfide in semi-manufactured steel material. In the manufacturing of hot rolled steel sheets, this soft sulfide is stretched in a wedge shape during hot rolling and causes a decrease in ductility in a direction perpendicular to the rolling direction of the hot rolled steel sheets. It is therefore desirable that the S content be lowered as much as possible. The S content is limited to not more than 0.007%, and is preferably not more than 0.004%. The S content may be zero without any problems.

Al: Not More than 0.1%

Aluminum functions as a deoxidizer. The Al content is desirably not less than 0.01% to obtain this effect. However, aluminum also forms inclusions in steel to inhibit the recrystallization of austenite grains during a hot rolling step. This adverse effect on recrystallization becomes marked if the Al content exceeds 0.1%. Thus, the Al content is limited to not more than 0.1%, and is preferably not more than 0.07%.

N: Not More than 0.01%

Nitrogen bonds to titanium, which is a carbide forming element, during steelmaking to form coarse nitride, and thus inhibits formation of fine carbide to cause a marked decrease in the strength of steel sheets. Further, coarse nitride significantly inhibits recrystallization of austenite grains during a hot rolling step in the manufacturing of hot rolled steel sheets. It is therefore desirable that the N content be lowered as much as possible. The N content is limited to not more than 0.01%, and is preferably not more than 0.006%. The N content may be zero without any problems.

Ti: 0.14% to 0.30%

Similarly to carbon, titanium prevents the precipitation and coarsening of carbide at high temperatures by retarding the occurrence or progress of austenite to ferrite transformation of steel during cooling after the completion of hot rolling in the manufacturing of hot rolled steel sheets, thereby exerting an effect of reducing, the size of carbide. After the occurrence of austenite to ferrite transformation, titanium bonds to carbon to form carbide which is finely dispersed in steel sheets. That is, titanium is an element that significantly strengthens the ferrite phase by forming fine carbide, and is essential for the strengthening of hot rolled steel sheets. To obtain hot rolled steel sheets with a tensile strength of not less than 850 MPa, the Ti content is to be 0.14% or more. If the Ti content exceeds 0.30%, coarse titanium carbide cannot be solved completely when the semi-manufactured steel material to be hot rolled is reheated in the manufacturing of hot rolled steel sheets, and the titanium carbide remaining in the steel causes a marked delay of the recrystallization of austenite grains during hot rolling. Thus, the Ti content needs to be not more than 0.30%, and is preferably not more than 0.28%.

Because the strength of steel sheets is proportional to the volume fraction of carbide, it is preferable that 80% or more of titanium be precipitated as carbide to reduce the amount of solute titanium. The precipitation of 80% or more titanium as carbide may be achieved by adjusting the austenite to ferrite transformation temperature. This temperature may be adjusted by controlling the chemical composition and the hot rolling conditions.

The semi-manufactured material steel contains carbon, sulfur, nitrogen and titanium in the aforementioned ranges and also to satisfy the inequality (1) below:

$$1.0 \leq ([C]/12)/([Ti^*]48) \quad (1)$$

$$[Ti^*]=[Ti]-3.4\times[N]-1.5\times[S]$$

([C], [S], [N] and [Ti]: contents (mass %) of the respective elements).

The inequality (1) is a requirement to be met for the steel to give hot rolled steel sheets having a tensile strength of not less than 850 MPa, and is an important index.

As already mentioned, we ensure the desired strength of steel sheets by finely precipitating carbides, mainly titanium carbide, in the hot rolled steel sheets. Titanium carbide shows a strong tendency to form a fine carbide structure with a very small average particle diameter. If, however, the atomic concentration of titanium in the steel exceeds the atomic concentration of carbon, the titanium carbide is prone to become coarsened and the solute carbon will produce only a limited effect in the control of the austenite to ferrite transformation temperature, making it difficult to ensure the desired strength (tensile strength: not less than 850 MPa) of hot rolled steel sheets. Provided that the portion of titanium that can contribute to forming the carbide is represented by "Ti*," it is necessary that the atomic percentage % of carbon present in the semi-manufactured steel material be not less than the atomic percentage % of Ti*. That is, the value of ([C]/12)/([Ti*]/48) is to be 1 or greater. The respective atomic percentages % are proportional to the mass percentages % of carbon and titanium divided by the atomic weights of carbon and titanium (C: 12, Ti: 48), respectively.

As will be described later, the prescribed amount of titanium is added to the semi-manufactured steel material, and the titanium carbide in the semi-manufactured steel material is solved by heating before hot rolling and is precipitated mainly at the time of coiling after the hot rolling. However, all of the titanium added to the semi-manufactured material steel does not contribute to forming the carbide, and part of the titanium added to the semi-manufactured steel material is consumed by formation of nitride and sulfide which do not contribute to strengthening of the steel sheets. This is because titanium is prone to form nitride and sulfide rather than carbide at temperatures higher than the coiling temperature, and formation of titanium nitride and titanium sulfide is predominant before the coiling step in the manufacturing of hot rolled steel sheets. We studied this fact with respect to the semi-manufactured steel materials having the aforementioned chemical composition. As a result, we found that the amount of Ti* indicating titanium which contributes to formation of carbide may be obtained by subtracting the amount of titanium consumed by formation of titanium nitride and titanium sulfide from the total amount of titanium added to the semi-manufactured steel material, and may be expressed by "[Ti]−3.4×[N]−1.5×[S]."

For the reasons described above, we provide that carbon, sulfur, nitrogen and titanium are contained such that the value of ([C]/12)/([Ti*]/48) becomes 1 or greater to make sure that the atomic percentage % of carbon will be not less than the atomic percentage % of Ti*. As already mentioned, a failure of ([C]/12)/([Ti*]/48) to be not less than 1 contributes to the coarsening of titanium carbide precipitated in the ferrite crystal grains as well as to the increase in the austenite to ferrite transformation temperature, causing deteriorations in the strength of hot rolled steel sheets and in manufacturing stability. If the value of ([C]/12)/([Ti*]/48) is less than 1, further, the amount of carbon available for the segregation in crystal grain boundaries in the ferrite phase is significantly small and consequently the grain boundary strength is lowered to cause a marked decrease in the strength and toughness of the hot rolled steel sheets.

The value of ([C]/12)/([Ti*]/48) is preferably 1.05 or more. If the value of ([C]/12)/([Ti*]648) exceeds 3.0, however, coarse titanium carbide formed in the semi-manufactured steel material cannot be solved completely when the semi-manufactured steel material to be hot rolled is heated during steps for the manufacturing of hot rolled steel sheets, thus causing a decrease in the strength of the final hot rolled steel sheets. If the value of ([C]/12)/([Ti*]/48) exceeds 3.0, carbon is present in large excess over titanium in the semi-manufactured steel material with the result that cementite formation is prone to occur and the steel sheet microstructure that is substantially a ferrite single phase microstructure will not be obtained. Thus, the value of ([C]/12)/([Ti*]/48) is preferably not more than 3.0.

While the aforementioned chemical composition is the basic composition, the semi-manufactured steel material may further contain 0.30% or less vanadium in addition to the basic chemical composition.

Vanadium bonds to carbon and titanium to form carbide, and contributes to further strengthening of the hot rolled steel sheets. The V content is preferably not less than 0.005% to obtain this effect. On the other hand, vanadium compares unfavorably to titanium in terms of carbide-forming ability and tends to remain in the solid solution state (as solute vanadium). This solute vanadium causes coarsening of carbide and a consequent decrease in the strength of steel sheets. If the V content exceeds 0.30%, solute vanadium comes to be present in such an excessively large amount that the adverse effect on the steel sheet strength becomes marked. Thus, the V content is preferably not more than 0.30%, more preferably not more than 0.26%, and still more preferably not more than 0.15%.

In addition to the basic chemical composition, the semi-manufactured steel material may further contain one or both of 1.0% or less tungsten and 0.5% or less molybdenum.

Similarly to vanadium, tungsten and molybdenum bond to titanium and carbon to form complex carbide, and contribute to further strengthening of the hot rolled steel sheets. Further, tungsten and molybdenum retard the progress of austenite to ferrite transformation of steel during cooling after the completion of hot rolling in the manufacturing of hot rolled steel sheets. Thus, these elements are also effective in stabilizing the manufacturing of hot rolled steel sheets. The W content is preferably not less than 0.01% and the Mo content is preferably not less than 0.01% to obtain these effects. If the W content and the Mo content exceed 1.0% and 0.5%, respectively, there is a risk that the austenite to ferrite transformation of steel may not complete during coiling subsequent to the cooling step after completion of hot rolling, and the resultant hot rolled steel sheets may not have a microstructure which is substantially a ferrite single phase (a ferrite phase with an area percentage of 95% or more). As a result, only a small amount of carbide is precipitated simultaneously with the austenite to ferrite transformation, and a concern arises that the strength of the hot rolled steel sheets is significantly lowered. Thus, it is preferable that the W content be not more than 1.0% and the Mo content be not more than 0.5%. It is more preferable that the W content be 0.01% to 0.5% and the Mo content be 0.01% to 0.3%.

Impurity Niobium: Less than 0.03%

During hot rolling, niobium is segregated on dislocations in austenite grains to inhibit the progress of the recrystallization thereof. The Nb content needs to be lowered to less than 0.03%, and more preferably to less than 0.02% to reduce the anisotropy in mechanical properties of hot rolled steel sheets. Since niobium is an impurity, the Nb content is most preferably zero.

Impurity Boron: Less than 0.0005%

During hot rolling, boron is segregated in grain boundaries of austenite grains and on dislocations therein to inhibit the progress of recrystallization, and also causes a significant increase in the recrystallization temperature of austenite grains. Thus, boron is an element that will increase the strain energy stored during rolling. If transformation occurs from non-recrystallized austenite grains, the ferrite grains are elongated in the rolling direction and such hot rolled steel sheets exhibit a marked anisotropy in mechanical properties. From the above viewpoints, the B content needs to be lowered to less than 0.0005%, and more preferably to less than 0.0003%. Since boron is an impurity, the B content is most preferably zero.

In addition to the basic chemical composition, the semi-manufactured steel material may further contain one or more of Sb, Cu, Ni, Sn, Cr, Ca, REM, Mg, Se, Te, Po, As, Bi, Ge, Pb, Ga, In, Ti, Zn, Cd, Hg, Ag, Au, Pd, Pt, Co, Rh, Ir, Ru, Os, Tc, Re, Ta, Be and Sr in a total content of not more than 1.0%. As long as the total content does not exceed 1.0%, these elements do not adversely affect the steel strength or the anisotropy in mechanical properties. The balance after the deduction of the aforementioned components is iron and inevitable impurities.

The semi-manufactured steel material having the aforementioned chemical composition is heated, hot rolled by rough rolling and finish rolling, cooled after the completion of finish rolling, and coiled, thereby producing a hot rolled steel sheet.

The steel may be refined by any method without limitation. Known refining methods such as converter furnaces and electric furnaces may be used. Secondary refining may be performed in a vacuum degassing furnace. From the viewpoint of productivity and quality, the refined steel is preferably formed into a slab (a semi-manufactured steel material) by a continuous casting method. Slabs may be also produced by known casting methods such as ingot making-blooming methods and thin slab continuous casting methods. Heating temperature T (° C.) for semi-manufactured steel material: not less than 1150° C.

The semi-manufactured steel material (steel slab) obtained as described above is subjected to rough rolling and finish rolling. It is necessary that the semi-manufactured steel material be heated prior to the rough rolling to obtain a substantially homogeneous austenite phase and to solve coarse carbide. If the heating temperature for the semi-manufactured steel material is below 1150° C., coarse titanium carbide is not solved. As a result, the amount of carbide that is finely dispersed in the cooling and coiling steps after completion of hot rolling is decreased, and the strength of the final hot rolled steel sheets is markedly lowered. Thus, the semi-manufactured steel material is heated such that the maximum temperature reaches 1150° C. or above, and preferably 1200° C. or above.

$$[\text{Ti}^*] < 10^{\{-7000/(T+273)+2.75\}}/[\text{C}] \quad (2)$$

$$[\text{Ti}^*] = [\text{Ti}] - 3.4 \times [\text{N}] - 1.5 \times [\text{S}]$$

T: heating temperature (° C.) for semi-manufactured steel material ([C], [S], [N] and [Ti]: contents (mass %) of the respective elements)

The semi-manufactured steel material to be rough rolled is heated at a heating temperature T (° C.) that is not less than 1150° C. and also satisfies the above inequality (2).

As already mentioned, coarse titanium carbide which has not been solved by reheating (heating prior to hot rolling) of the semi-manufactured steel material retards recrystallization of austenite grains. As a result, the austenite to ferrite transformation point is elevated to cause a decrease in the strength of steel sheets and an increase in the anisotropy in mechanical properties of the hot rolled steel sheets. We studied this fact with respect to the semi-manufactured steel materials having the aforementioned chemical composition. Consequently, we found that contents of the above elements should satisfy the inequality (2) to solve coarse titanium carbide in the semi-manufactured steel material by heating before hot rolling. In the inequality (2), the left side, namely, [Ti*] is a value obtained by subtracting the amount of titanium in the forms of nitride and sulfide which have occurred during steelmaking from the Ti content, and represents the amount of titanium substantially contributing to strengthening by forming titanium carbide. The letter T is the heating temperature T (° C.) for the semi-manufactured steel material, namely, the maximum temperature reached during reheating of the semi-manufactured steel material.

Time for which semi-manufactured steel material is held at temperatures of 1150° C. or above: not less than 15 minutes Even when the semi-manufactured steel material to be rough rolled is heated at temperatures of not less than 1150° C., coarse titanium carbide cannot be completely solved if the semi-manufactured steel material is held at 1150° C. or above for less than 15 minutes. Thus, the time for which the semi-manufactured steel material is held at temperatures of 1150° C. or above is limited to not less than 15 minutes, and is preferably not less than 20 minutes. The upper limit of the holding time is not particularly limited. From the viewpoint of manufacturing efficiency, however, the holding time is preferably not more than 30 hours.

If the heating temperature T (° C.) for the semi-manufactured steel material exceeds 1350° C., scale loss is increased and the surface properties of steel sheets are deteriorated by scale defects. Thus, the heating temperature T (° C.) is preferably not more than 1350° C.

The semi-manufactured steel material heated as described above is subjected to hot rolling under prescribed conditions.

Total Reduction Ratio in Temperature Range of 980° C. And Below: Not More than 40%

When the semi-manufactured steel material having the aforementioned chemical composition undergoes rolling at temperatures of less than 980° C., the progress of recrystallization of austenite grains is slow and a large amount of strain energy is stored in the austenite grains. As a result, nearly equiaxial ferrite grains cannot be obtained during cooling after completion of hot rolling, causing an increased anisotropy in mechanical properties of hot rolled steel sheets. Further, rolling at such low temperatures increases the power that drives the austenite to ferrite transformation of steel during cooling after completion of hot rolling, and the ferrite transformation is caused to take place at a high temperature, resulting in the coarsening of carbide and a decrease in the strength of hot rolled steel sheets.

For these reasons, reduction by hot rolling is desirably reduced as much as possible in the temperature range of 980° C. and below at which recrystallization of austenite grains proceeds slowly. If the total reduction ratio by hot rolling at 980° C. and below exceeds 40%, the adverse effects described above become manifest. Thus, the total reduction ratio is limited to not more than 40%, and is preferably not more than 33%. The total reduction ratio at 980° C. and below indicates the total of the reduction ratios by rough rolling and finish rolling. The total reduction ratio at 980° C. and below may be 0%.

Finish Rolling Temperature: Not Less than 880° C.

If the finish rolling temperature is below 880° C., the amount of strain energy stored in the austenite grains is significantly increased to result in the manifestation of problems associated with the anisotropy in mechanical properties and the strength of hot rolled steel sheets. Thus, the finish rolling temperature is limited to not less than 880° C., and is preferably not less than 890° C. The upper limit of the finish rolling temperature is not particularly limited, but is automatically determined by factors such as the temperature of heating before hot rolling, the sheet pass speed during rolling, and the steel sheet thickness. The upper limit of the finish rolling temperature is substantially 1000° C.

Time Between Completion of Finish Rolling and Start of Forced Cooling: Within 3 Seconds Because the semi-manufactured steel material having the aforementioned chemical composition has a high ferrite transformation point, the austenite to ferrite transformation starts at a high temperature to cause the coarsening of carbide unless the hot rolled steel sheet is cooled immediately after finish rolling. It is therefore necessary that forced cooling be started immediately after the hot rolling is completed. Cooling is started at least within 3 seconds, and preferably within 2 seconds after the completion of finish rolling.

Average Cooling Rate: 40° C./sec. to 200° C./sec.

If forced cooling subsequent to finish rolling is performed at an average cooling rate of less than 40° C./sec., the austenite to ferrite transformation is allowed to start at a high temperature to make it impossible to obtain fine carbide, resulting in a decrease in the strength of the hot rolled steel sheets. On the other hand, cooling at an average rate exceeding 200° C./sec. destabilizes the cooling end temperature and results in a mixed microstructure including a martensite phase and a bainite phase. Consequently, the hot rolled steel sheets will not have a microstructure that is substantially a ferrite single phase microstructure (a ferrite phase with an area percentage of 95% or more). This result means a decrease in the amount of carbide precipitated in synchronization with the austenite to ferrite transformation in the cooling and coiling steps after completion of hot rolling, and the tensile strength of the hot rolled steel sheets does not reach 850 MPa. Thus, the average cooling rate of the forced cooling after the completion of finish rolling is limited to not more than 200° C./sec., and is preferably from 50° C./sec. to 150° C./sec. The average cooling rate indicates an average cooling rate from the start of forced cooling to the end of cooling. Because only air cooling is applied after termination of forced cooling, the temperature of the steel sheet is not substantially lowered until the steel sheet is coiled. The cooling end temperature is usually at a temperature about 5 to 10° C. higher than the coiling temperature.

When the austenite to ferrite transformation point of the steel is controlled to fall in the coiling temperature range described below, carbide may be precipitated finely and in large amounts in the crystal grains of the ferrite phase. The average cooling rate is preferably set to 50° C./sec. or above so that the steel that is being cooled attains an austenite to ferrite transformation point controlled in the coiling temperature range described below.

Coiling Temperature: 500° C. to 680° C.

As mentioned above, fine carbide may be precipitated and in large amounts in the crystal grains of the ferrite phase at low temperatures. From this viewpoint, the coiling temperature (and the austenite to ferrite transformation point) is advantageously low. If, however, the coiling temperature is less than 500° C., the diffusion of elements is retarded and consequently carbide cannot be precipitated in a sufficient amount. If the coiling temperature (and the austenite to ferrite transformation point) exceeds 680° C., the carbide that is precipitated substantially at the same time as the austenite to ferrite transformation is coarsened and the strength of hot rolled steel sheets is lowered. Further, such a high coiling temperature increases the average crystal grain diameter of the ferrite phase in the final hot rolled steel sheets, resulting in a decrease in the strength of the hot rolled steel sheets. Thus, the coiling temperature is limited to 500° C. to 680° C., and preferably 550° C. to 660° C.

The hot rolled and coiled steel sheets may have scales on the surface or may be cleaned of scales by acid pickling. The presence or absence of scales does not affect the properties of the steel sheets. The hot rolled and coiled steel sheets may be subjected to a coating treatment to form a coating (plating layer) on the surface of the hot rolled steel sheets. The types of the coating treatments are not particularly limited, and any of electroplating treatments and electroless plating treatments may be adopted. The alloy components in the coatings are not particularly limited. For example, the coating treatment may be hot dip galvanization in which a hot dip galvanized zinc coating is formed. Alternatively, the hot dip galvanization may be followed by an alloying treatment to form a galvannealed zinc coating. Hot dip coating may involve metals and alloys other than zinc such as aluminum and aluminum alloys.

Annealing at a temperature of 740° C. or below does not cause changes in the state of precipitates in the hot rolled steel sheets obtained. Thus, for example, the hot rolled steel sheets may be passed through a continuous hot dip galvanization line in which the annealing temperature is 740° C. or below. As long as the thermal history in the continuous hot dip galvanization line is experienced at temperatures of 740° C. or below, the carbide precipitated in the crystal grains of the ferrite phase that is the matrix in the hot rolled steel sheets remains intact and the mechanical properties of the steel sheets are not changed.

Examples of the coating (plating) methods include dipping of the steel sheets into a coating bath. Examples of the alloying methods include heating of the coated surface of the steel sheets in furnaces such as gas furnaces.

According to the manufacturing method described above, high strength hot rolled steel sheets having a tensile strength of not less than 850 MPa and a small anisotropy in mechanical properties may be obtained in which the ferrite phase has an area percentage of not less than 95%, the ferrite phase has an average crystal grain diameter of not more than 8 μm, the crystal grains of the ferrite phase have an aspect ratio of not more than 3.5, and the crystal grains of the ferrite phase have an average carbide particle diameter of less than 10 nm. Our manufacturing methods are suited for the manufacturing of high strength hot rolled steel sheets with a tensile strength of up to about 1165 MPa, and more preferably about 1100 MPa or below.

Next, there will be described the reasons why the microstructure of the high strength hot rolled steel sheets is limited.

Area Percentage of Ferrite Phase: Not Less than 95%

As already mentioned, the semi-manufactured steel material containing the prescribed amounts of carbide-forming elements such as titanium is heated to the austenite single phase region and is thereafter hot rolled, and fine carbide is allowed to be abundantly precipitated in synchronization with the austenite to ferrite transformation after completion of hot rolling, thereby achieving an increase in the strength of hot rolled steel sheets. It is necessary that substantially the whole of titanium in the semi-manufactured steel material be precipitated as fine carbide to obtain hot rolled steel sheets having a tensile strength of not less than 850 MPa. Based on the fact that the carbide contributing to the strengthening of steel sheets is precipitated as the austenite to ferrite transformation takes place, it is desirable that the austenite to ferrite transformation be promoted so that substantially the whole of titanium in the semi-manufactured steel material will be precipitated as fine carbide. That is, it is desirable that the final hot rolled steel sheets have a large area percentage of the ferrite phase.

If the area percentage of the ferrite phase in the hot rolled steel sheets is less than 95%, the amount of carbide precipitated is insufficient and a tensile strength of not less than 850 MPa cannot be obtained. Thus, the area percentage of the ferrite phase in the hot rolled steel sheets is limited to not less than 95%, and is preferably not less than 98%. The ferrite phase includes polygonal ferrite, bainitic ferrite, acicular ferrite and granular ferrite.

In the hot rolled steel sheets, the microstructure may include phases other than the ferrite phase such as cementite, pearlite, bainite and martensite phases. If these structures are present in large amounts, the amount of fine carbide precipitates becomes correspondingly small to cause a decrease in the strength of steel sheets. Thus, the amounts of these structures are preferably reduced as much as possible. However, the presence of such structures is acceptable as long as the total area percentage is 5% or less, and more preferably 2% or less of the entire microstructure.

Average Ferrite Crystal Grain Diameter: Not More than 8 μm

If the average crystal grain diameter of ferrite is larger than 8 μm, the amount of strengthening by fine crystal grains is lowered and thus high strength hot rolled steel sheets having a tensile strength of not less than 850 MPa cannot be obtained. Further, the microstructure having such mixed grain sizes causes mechanical properties to be nonuniform, and exhibits an increased anisotropy. Thus, the average crystal grain diameter is limited to not more than 8 μm, and is preferably less than 6 μm.

Aspect Ratio of Crystal Grains of Ferrite Phase: Not More than 3.5

If the microstructure of the hot rolled steel sheet includes elongated crystal grains in the ferrite phase, the application of external force to the hot rolled steel sheet causes non-uniform rotations and deformations of the ferrite crystal grains in the direction of the application of external force. Consequently, the anisotropy in mechanical properties of the hot rolled steel sheet is increased. For these reasons, the anisotropy in mechanical properties of the hot rolled steel sheets is advantageously reduced by controlling the ferrite grains to be equiaxial. If the aspect ratio exceeds 3.5, the anisotropy in mechanical properties of the hot rolled steel sheets is increased, and press forming of such hot rolled steel sheets encounters various problems such as the unexpected occurrence of cracks during press forming. Thus, the aspect ratio of the crystal grains of the ferrite phase is limited to not more than 3.5, and is preferably not more than 2.5.

The "aspect ratio of the crystal grains of the ferrite phase" is determined by a linear intercept method in accordance with ASTM E 112-10 with respect to a cross section (an L cross section) parallel to the rolling direction. In detail, the aspect ratio is defined as being obtained by drawing three horizontal lines and three vertical lines on a 400 times micrograph, and expressing the average length of vertical lines which intersect through the ferrite crystal grains (the mean intercept length of each ferrite grain) as a ratio to the mean intercept length along the horizontal direction. The lower limit of the aspect ratio is about 1.4.

Carbides in Ferrite Crystal Grains

The carbides finely precipitated in crystal grains of the ferrite phase include titanium carbide, or further vanadium carbide, tungsten carbide, molybdenum carbide and complex carbides of titanium with vanadium, tungsten and molybdenum. Many of these carbides are precipitated in phase interfaces at the same time as the austenite to ferrite transformation during the cooling and coiling steps after the completion of finish rolling in the hot rolled steel sheet manufacturing steps.

Average Particle Diameter of Carbides in Ferrite Crystal Grains: Less than 10 nm The steel is strengthened by finely dispersing the carbides such as titanium carbide. The coarsening of carbide decreases the number of carbide particles that inhibit the motion of dislocations when the steel sheet is deformed. That is, the strength of steel sheets is increased with finer sizes of carbides. It is necessary that the average particle diameter of the carbides be less than 10 nm, and preferably not more than 6 nm to obtain high strength hot rolled steel sheets with a tensile strength of not less than 850 MPa.

The hot rolled steel sheets do not largely change their quality even when subjected to a short heat treatment at up to 740° C. By virtue of this characteristic, the hot rolled steel sheets may be subjected to a coating (plating) treatment to form a coating on the surface which imparts corrosion resistance to the steel sheets. Since the heating in a coating treatment may be operated at 740° C. or below, the aforementioned advantageous effects are not impaired even when the hot rolled steel sheets are subjected to a coating treatment. The types of the coatings are not particularly limited, and any of electroplated coatings and electroless plated coatings may be applied. The alloy components in the coatings are not particularly limited. Suitable examples include hot dip galvanized zinc coatings and galvannealed zinc coatings. However, the coatings are not limited thereto and any of conventional coatings may be used.

EXAMPLES

Semi-manufactured steel materials 250 mm in thickness which had a chemical composition described in Table 1 were hot rolled under conditions described in Table 2, thereby manufacturing hot rolled steel sheets having a sheet thickness of 1.2 to 3.2 mm. The cooling rates described in Table 2 indicate average cooling rates from the start of forced cooling to the end of cooling. Some of the hot rolled steel sheets obtained were passed through a hot dip galvanization line in which the annealing temperature was set at 700 to 720° C., and were thereafter immersed into a 460° C. coating bath (coating composition: Zn-0.13 mass % Al) to form galvanized steel sheets (GI). Some other steel sheets were passed through the above hot dip galvanization line, immersed in the above coating bath, and further subjected to an alloying treatment at 520° C. to form galvannealed steel sheets (GA). The mass of coating per unit area was 45 g/m² on each surface for both of the GI steel sheets and the GA steel sheets.

A separate test confirmed that the austenite to ferrite transformation had not occurred during cooling until coiling for all the steel sheets except the steel sheets Nos. 3 to 9 and 18 to 23.

TABLE 1

| Steel | Chemical composition (mass %) | | | | | | | | | | |
|---|---|---|---|---|---|---|---|---|---|---|---|
| | C | Si | Mn | P | S | Al | N | Ti | V | Mo | W |
| A | 0.082 | 0.05 | 1.05 | 0.01 | 0.0021 | 0.043 | 0.0041 | 0.16 | — | — | — |
| B | 0.061 | 0.06 | 0.48 | 0.01 | 0.0026 | 0.044 | 0.0039 | 0.22 | — | — | — |
| C | 0.125 | 0.05 | 0.18 | 0.01 | 0.0009 | 0.044 | 0.0040 | 0.18 | — | — | — |
| D | 0.071 | 0.03 | 0.95 | 0.01 | 0.0024 | 0.040 | 0.0037 | 0.28 | — | — | — |
| E | 0.098 | 0.01 | 0.31 | 0.01 | 0.0015 | 0.039 | 0.0040 | 0.20 | — | — | — |
| F | 0.076 | 0.01 | 1.11 | 0.01 | 0.0015 | 0.039 | 0.0040 | 0.16 | 0.10 | — | — |
| G | 0.105 | 0.04 | 0.35 | 0.01 | 0.0020 | 0.041 | 0.0015 | 0.14 | 0.24 | — | — |
| H | 0.081 | 0.08 | 0.18 | 0.01 | 0.0020 | 0.041 | 0.0015 | 0.15 | — | 0.18 | — |
| I | 0.082 | 0.01 | 0.24 | 0.01 | 0.0018 | 0.040 | 0.0015 | 0.15 | 0.04 | 0.10 | 0.05 |
| J | 0.051 | 0.08 | 0.41 | 0.01 | 0.0016 | 0.038 | 0.0034 | 0.16 | — | — | — |
| K | 0.071 | 0.01 | 1.52 | 0.01 | 0.0017 | 0.039 | 0.0037 | 0.17 | — | — | — |
| L | 0.076 | 0.02 | 0.37 | 0.01 | 0.0085 | 0.040 | 0.0015 | 0.16 | — | — | — |
| M | 0.082 | 0.03 | 0.43 | 0.01 | 0.0014 | 0.041 | 0.0028 | 0.19 | — | — | — |
| N | 0.079 | 0.01 | 0.40 | 0.01 | 0.0008 | 0.045 | 0.0031 | 0.17 | — | — | — |
| O | 0.058 | 0.02 | 0.48 | 0.01 | 0.0019 | 0.043 | 0.0028 | 0.27 | — | — | — |

| Steel | Chemical composition (mass %) | | | Right side in inequality | | Remarks |
|---|---|---|---|---|---|---|
| | Nb | B | Others | [Ti*] [1] | (1) [2] | |
| A | 0.005 | 0.0001 | — | 0.14 | 2.30 | Inv. Ex. |
| B | 0.007 | 0.0001 | — | 0.20 | 1.20 | Inv. Ex. |
| C | 0.009 | 0.0001 | — | 0.17 | 3.03 | Inv. Ex. |
| D | 0.002 | <0.0001 | REM: 0.0021, Cd: 0.0001, Ag: 0.0002, Co: 0.002, Os: 0.0001, Be: 0.0001, Po: 0.0001, Ga: 0.0001 | 0.26 | 1.08 | Inv. Ex. |
| E | 0.005 | 0.0001 | Ni: 0.021, Cr: 0.045, Cu: 0.08, Sn: 0.001, Sb: 0.1, Mg: 0.002, Rh: 0.0001 | 0.18 | 2.13 | Inv. Ex. |
| F | 0.005 | <0.0001 | Se: 0.0001, Bi: 0.0001, In: 0.0002, Zn: 0.0002, Pd: 0.0001, Ir: 0.0001, Ru: 0.0001, Re: 0.0001, Sn: 0.001 | 0.14 | 2.11 | Inv. Ex. |
| G | 0.004 | <0.0001 | Te: 0.0001, As: 0.0001, Ge: 0.002, Pb: 0.0001, Tl: 0.0001, Hg: 0.0001, Au: 0.0002, Pt: 0.0001, Tc: 0.0001, Ta: 0.0001, Sr: 0.0001, Ca: 0.004 | 0.13 | 3.18 | Inv. Ex. |
| H | 0.004 | <0.0001 | — | 0.14 | 2.28 | Inv. Ex. |
| I | 0.001 | 0.0001 | — | 0.14 | 2.31 | Inv. Ex. |
| J | 0.007 | 0.0001 | — | 0.15 | 1.40 | Comp. Ex. |
| K | 0.005 | 0.0002 | — | 0.15 | 1.83 | Comp. Ex. |
| L | 0.006 | 0.0001 | — | 0.14 | 2.14 | Comp. Ex. |
| M | 0.050 | 0.0001 | — | 0.18 | 1.84 | Comp. Ex. |
| N | 0.005 | 0.0012 | — | 0.16 | 2.00 | Comp. Ex. |
| O | 0.006 | 0.0001 | — | 0.26 | 0.87 | Comp. Ex. |

[1] $[Ti^*] = [Ti] - 3.4 \times [N] - 1.5 \times [S]$
[2] Value of $([C]/12)/([Ti^*]/48)$
([C], [N], [S], [Ti]: contents (mass %) of respective elements)

TABLE 2

| | | | | | Hot rolling step | | | | | | |
|---|---|---|---|---|---|---|---|---|---|---|---|
| Steel sheet No. | Steel | Slab heating temp. T (° C.) | Right side in inequality (2)[3] | Satisfaction of inequality (2) | Slab holding time at 1150° C. and above (min) | Total reduction ratio at 980° C. and | Finish rolling temp. (° C.) | Time to start of cooling[4] (sec.) | Cooling rate[5] (° C./sec.) | Coiling temp. (° C.) | Remarks |
| 1 | A | 1230 | 0.15 | Yes | 21 | 33 | 900 | 1.5 | 50 | 570 | Inv. Ex. |
| 2 | | 1240 | 0.16 | Yes | 18 | 0 | 990 | 1.4 | 60 | 640 | Inv. Ex. |
| 3 | | 1220 | 0.14 | No | 20 | 25 | 930 | 1.1 | 50 | 600 | Comp. Ex. |
| 4 | | 1240 | 0.16 | Yes | 10 | 7 | 920 | 1.6 | 60 | 600 | Comp. Ex. |
| 5 | | 1240 | 0.16 | Yes | 20 | 45 | 900 | 1.0 | 60 | 600 | Comp. Ex. |
| 6 | | 1240 | 0.16 | Yes | 20 | 17 | 870 | 0.9 | 50 | 600 | Comp. Ex. |
| 7 | | 1250 | 0.17 | Yes | 19 | 10 | 960 | 1.6 | 20 | 610 | Comp. Ex. |
| 8 | | 1240 | 0.16 | Yes | 24 | 14 | 950 | 1.5 | 50 | 480 | Comp. Ex. |
| 9 | | 1250 | 0.17 | Yes | 18 | 17 | 910 | 1.4 | 60 | 720 | Comp. Ex. |
| 10 | B | 1250 | 0.23 | Yes | 21 | 25 | 920 | 1.7 | 60 | 610 | Inv. Ex. |
| 11 | C | 1320 | 0.18 | Yes | 25 | 22 | 930 | 1.4 | 40 | 590 | Inv. Ex. |
| 12 | D | 1310 | 0.30 | Yes | 22 | 15 | 950 | 1.4 | 70 | 600 | Inv. Ex. |
| 13 | E | 1300 | 0.20 | Yes | 29 | 0 | 980 | 1.2 | 70 | 620 | Inv. Ex. |
| 14 | F | 1240 | 0.17 | Yes | 27 | 28 | 920 | 1.7 | 50 | 600 | Inv. Ex. |
| 15 | G | 1260 | 0.15 | Yes | 19 | 10 | 910 | 1.6 | 60 | 630 | Inv. Ex. |
| 16 | H | 1250 | 0.18 | Yes | 23 | 5 | 930 | 1.4 | 70 | 600 | Inv. Ex. |
| 17 | I | 1250 | 0.17 | Yes | 27 | 10 | 940 | 1.8 | 60 | 590 | Inv. Ex. |
| 18 | J | 1250 | 0.28 | Yes | 24 | 20 | 920 | 1.3 | 60 | 600 | Comp. Ex. |
| 19 | K | 1250 | 0.20 | Yes | 20 | 25 | 930 | 1.5 | 50 | 580 | Comp. Ex. |
| 20 | L | 1250 | 0.19 | Yes | 32 | 17 | 930 | 1.3 | 60 | 600 | Comp. Ex. |
| 21 | M | 1250 | 0.17 | No | 39 | 33 | 900 | 1.8 | 70 | 620 | Comp. Ex. |
| 22 | N | 1250 | 0.18 | Yes | 17 | 25 | 920 | 1.2 | 60 | 600 | Comp. Ex. |
| 23 | O | 1280 | 0.31 | Yes | 25 | 19 | 930 | 1.4 | 60 | 640 | Comp. Ex. |
| 24 | F | 1250 | 0.17 | Yes | 32 | 65 | 860 | 1.1 | 60 | 600 | Comp. Ex. |

[3]Value of $10^{(-7000/(T+273) +2.75)}$/[C]. (T: maximum temperature reached during slab heating (° C.), [C]: C content (mass %))
[4]Time from completion of finish rolling to start of forced cooling (sec.).
[5]Average cooling rate from start of forced cooling to end of cooling (° C./sec.).

Test pieces were sampled from the hot rolled steel sheets obtained above (the hot rolled steel sheets, the GI steel sheets and the GA steel sheets) and were subjected to a microstructure observation and a tensile test, thereby determining the area percentage of the ferrite phase, the types and area percentages of phases other than the ferrite phase, the average crystal grain diameter and the aspect ratio of the ferrite phase, the average carbide particle diameter, the yield strength, the tensile strength and the elongation. The testing methods were as follows.

(i) Microstructure Observation

The area percentage of the ferrite phase was evaluated in the following manner. A sheet thickness-wise center portion of a cross section parallel to the rolling direction was etched with 5% Nital. The exposed microstructure was enlarged 400 times with a scanning optical microscope, and ten fields of view were micrographed. The ferrite phase is a structure having no corrosion marks or cementite in the grains. The area percentage and the grain diameter were measured with respect to the ferrite structures including polygonal ferrite, bainitic ferrite, acicular ferrite and granular ferrite. To determine the area percentage of the ferrite phase, the images were analyzed to separate the ferrite phase and other phases such as bainite and martensite, and the percentage of the area of the ferrite phase to the observed fields of view was calculated. The calculation considered linear crystal boundaries as part of the ferrite phase.

The average ferrite crystal grain diameter was determined by a linear intercept method in accordance with ASTM E 112-10 with respect to three of the above micrographs on which three horizontal lines and three vertical lines had been drawn. The final result was obtained by averaging the results obtained with respect to the three micrographs, as described in Table 3.

To determine the aspect ratio of the crystal grains of the ferrite phase, the above L-direction cross section of the hot rolled steel sheet was analyzed to determine the ratio of the average length in which the straight lines perpendicular to the L direction were across the ferrite grain boundaries, to the average length in which the straight lines parallel to the L direction were across the ferrite grain boundaries.

To determine the average particle diameter of carbides in the crystal grains of the ferrite phase, a sample was fabricated from a sheet thickness-wise center portion of the hot rolled steel sheet by a thin film method and was observed with a transmission electron microscope (magnification: 120000 times). The average diameter of at least one hundred precipitate particles was obtained. This calculation of the precipitate particle diameters excluded coarse cementite having particle diameters larger than 1.0 μm as well as nitride. The lower limit diameter of carbide particles identifiable in this measurement method was about 0.5 to 1 nm.

(ii) Tensile Test

From the hot rolled steel sheet, JIS No. 5 tensile test pieces were sampled along a direction which was perpendicular to the rolling direction in the plane of the steel sheet (a C direction) and along a direction which was parallel to the rolling direction (an L direction), these directions defining the longitudinal direction of the respective test pieces. A tensile test was performed in accordance with JIS Z 2241 (2011) five times with respect to each of the C direction and the L direction, and the averages of yield strength (YS), tensile strength (TS) and total elongation (El) were obtained. In the tensile test, the cross head speed was 10 mm/min. The anisotropy in mechanical properties was defined as a difference in absolute value obtained by subtracting the tensile strength in the L direction from the tensile strength in the C direction, or as a difference in absolute value obtained by subtracting the total elongation in the L direction from the total elongation in the C direction. The anisotropy in mechanical properties was evaluated "Good" when the difference in tensile strength in absolute value (ΔTS) was not more than 30 MPa and the difference in total elongation in absolute value (ΔEl) was not more than 2%, and was evaluated "Bad" when these two were not satisfied.

The results are described in Table 3.

TABLE 3

| Steel sheet No. | Surface state of hot rolled steel sheet[6] | Microstructure of hot rolled steel sheet | | | | Mechanical properties of hot rolled steel sheet | | | | | | | | | |
|---|---|---|---|---|---|---|---|---|---|---|---|---|---|---|---|
| | | Ferrite phase area percentage (%) | Ferrite grain diameter[7] (μm) | Ferrite grain aspect ratio | Carbide particle diameter[8] (nm) | C direction | | | L direction | | | Anisotropy | | Eval-uation | Re-marks |
| | | | | | | Yield strength YS (MPa) | Tensile strength TS (MPa) | Elon-gation EL (%) | Yield strength YS (MPa) | Tensile strength TS (MPa) | Elon-gation EL (%) | ΔTS (MPa) | ΔEL (%) | | |
| 1 | Bare | 99 (balance: cementite) | 4 | 3.2 | 3 | 794 | 873 | 18 | 808 | 860 | 18 | 13 | 0 | Good | Inv. Ex. |
| | GA | 100 | 4 | 3.0 | 3 | 791 | 869 | 18 | 789 | 855 | 18 | 14 | 0 | Good | Inv. Ex. |
| 2 | Bare | 100 | 3 | 3.1 | 4 | 803 | 881 | 18 | 811 | 871 | 18 | 10 | 0 | Good | Inv. Ex. |
| 3 | Bare | 100 | 4 | 3.7 | 3 | 746 | 829 | 17 | 708 | 795 | 15 | 34 | 2 | Bad | Comp. Ex. |
| 4 | Bare | 99 (balance: cementite) | 5 | 3.6 | 4 | 702 | 826 | 17 | 697 | 792 | 15 | 34 | 2 | Bad | Comp. Ex. |
| 5 | Bare | 100 | 5 | 4.1 | 3 | 747 | 859 | 17 | 736 | 818 | 14 | 41 | 3 | Bad | Comp. Ex. |
| 6 | Bare | 100 | 5 | 3.9 | 4 | 788 | 856 | 17 | 732 | 813 | 15 | 43 | 2 | Bad | Comp. Ex. |
| 7 | Bare | 100 | 6 | 3.1 | 11 | 713 | 820 | 18 | 729 | 801 | 18 | 19 | 0 | Good | Comp. Ex. |
| 8 | Bare | 91 (balance: bainite) | 4 | 2.8 | 3 | 722 | 839 | 18 | 721 | 814 | 18 | 25 | 0 | Good | Comp. Ex. |
| 9 | Bare | 100 | 9 | 3.0 | 10 | 718 | 798 | 19 | 684 | 761 | 20 | 37 | 1 | Bad | Comp. Ex. |
| 10 | Bare | 100 | 3 | 2.4 | 3 | 912 | 981 | 18 | 911 | 980 | 17 | 1 | 1 | Good | Inv. Ex. |
| | GI | 100 | 4 | 2.3 | 3 | 892 | 980 | 19 | 895 | 983 | 18 | 3 | 1 | Good | Inv. Ex. |
| 11 | Bare | 100 | 4 | 1.5 | 2 | 810 | 900 | 18 | 806 | 896 | 18 | 4 | 0 | Good | Inv. Ex. |
| | GI | 100 | 4 | 1.4 | 3 | 821 | 892 | 18 | 819 | 890 | 18 | 2 | 0 | Good | Inv. Ex. |
| 12 | Bare | 100 | 4 | 2.9 | 2 | 957 | 1052 | 16 | 945 | 1039 | 18 | 13 | 0 | Good | Inv. Ex. |
| | GA | 100 | 5 | 2.9 | 3 | 953 | 1051 | 17 | 939 | 1032 | 17 | 19 | 0 | Good | Inv. Ex. |
| 13 | Bare | 100 | 4 | 2.2 | 2 | 871 | 937 | 18 | 867 | 932 | 18 | 5 | 0 | Good | Inv. Ex. |
| | GA | 100 | 4 | 2.3 | 3 | 862 | 927 | 19 | 865 | 930 | 19 | 3 | 0 | Good | Inv. Ex. |
| 14 | Bare | 100 | 4 | 3.1 | 3 | 930 | 1011 | 17 | 920 | 1001 | 17 | 10 | 0 | Good | Inv. Ex. |
| | GA | 100 | 4 | 3.0 | 3 | 922 | 1009 | 17 | 913 | 998 | 17 | 11 | 0 | Good | Inv. Ex. |
| 15 | Bare | 100 | 4 | 2.1 | 2 | 1066 | 1165 | 16 | 1060 | 1158 | 17 | 7 | 1 | Good | Inv. Ex. |
| | GA | 100 | 5 | 2.3 | 3 | 1057 | 1161 | 16 | 1051 | 1155 | 17 | 6 | 1 | Good | Inv. Ex. |
| 16 | Bare | 100 | 4 | 2.3 | 3 | 916 | 1006 | 17 | 908 | 997 | 18 | 9 | 1 | Good | Inv. Ex. |
| | GA | 100 | 5 | 2.2 | 3 | 897 | 997 | 17 | 896 | 996 | 17 | 1 | 0 | Good | Inv. Ex. |
| 17 | Bare | 100 | 4 | 2.2 | 4 | 959 | 1020 | 17 | 950 | 1011 | 17 | 9 | 0 | Good | Inv. Ex. |
| | GA | 100 | 4 | 2.3 | 4 | 949 | 1015 | 17 | 942 | 1008 | 17 | 7 | 0 | Good | Inv. Ex. |
| 18 | Bare | 100 | 5 | 2.8 | 3 | 755 | 839 | 19 | 749 | 832 | 18 | 7 | 1 | Good | Comp. Ex. |
| 19 | Bare | 100 | 5 | 3.8 | 3 | 803 | 882 | 19 | 770 | 846 | 18 | 36 | 1 | Bad | Comp. Ex. |
| 20 | Bare | 100 | 4 | 2.9 | 3 | 782 | 860 | 16 | 773 | 849 | 12 | 11 | 4 | Bad | Comp. Ex. |
| 21 | Bare | 100 | 5 | 3.7 | 3 | 848 | 921 | 17 | 814 | 885 | 17 | 36 | 0 | Bad | Comp. Ex. |
| 22 | Bare | 98 (balance: bainite) | 5 | 4.0 | 3 | 755 | 888 | 18 | 717 | 843 | 15 | 45 | 3 | Bad | Comp. Ex. |
| 23 | Bare | 100 | 4 | 3.3 | 12 | 708 | 814 | 19 | 690 | 793 | 20 | 21 | 1 | Good | Comp. Ex. |
| 24 | Bare | 100 | 3 | 8.5 | 3 | 956 | 1043 | 17 | 915 | 998 | 16 | 45 | 1 | Bad | Comp. Ex. |

[6]Coating treatment. Bare: no coating GI: hot dip galvanized zinc coating GA: galvannealed zinc coating
[7]Average ferrite crystal grain diameter
[8]Average particle diameter of carbide in ferrite grains All of the hot rolled steel sheets in our Examples achieved a tensile strength TS of not less than 850 MPa and performed well in the evaluation of the anisotropy in mechanical properties, namely, had a small anisotropy in mechanical properties. In contrast, the hot rolled steel sheets in Comparative Examples failed to achieve the desired strength or had a large anisotropy in mechanical properties.

The invention claimed is:

1. A method of manufacturing a hot rolled steel sheet comprising subjecting a semi-manufactured steel material to heating, hot rolling including rough rolling and finish rolling, cooling after the completion of finish rolling, and coiling, thereby producing a hot rolled steel sheet, wherein the semi-manufactured steel material has a chemical composition including, by mass%,
C: 0.055% to 0.15%, Si: not more than 0.2%,
Mn: not more than 1.3%, P: not more than 0.03%,
S: not more than 0.007%, Al: not more than 0.1%,
N: not more than 0.01%, and Ti: 0.14% to 0.30%,
the contents of carbon, sulfur, nitrogen and titanium satisfying the inequality (1) below, the contents of niobium and boron as impurities being Nb: less than 0.03% and B: less than 0.0005%, the balance comprising Fe and inevitable impurities, the heating is performed at a heating temperature T (° C.) of not less than 1150°C., the heating temperature satisfying the inequality (2) below, the semi-manufactured steel material being held at the temperature range of not less than 1150°C. for 15 minutes or more, the hot rolling is performed with a total reduction ratio in a temperature range of 980°C. or below of not more than 40%, the finish rolling is performed at a finish rolling temperature of not less than 880°C., the cooling is started within 3 seconds after the completion of finish rolling and is performed at an average cooling rate of 40°C/sec, to 200°C/sec., and the coiling is performed at a coiling temperature of 500°C. to 680°C., wherein:

$$1.0 \leq ([C]/12)/([Ti^*]/48) \quad (1)$$

$$[Ti^*] < 10^{\{-7000/(T+273)+2.75\}}/[C] \quad (2)$$

$$[Ti^*] = [Ti] - 3.4 \times [N] - 1.5 \times [S]$$

T: heating temperature (° C.) for the semi-manufactured steel material ([C], [S], [N] and [Ti]: contents (mass %) of the respective elements).

2. The method according to claim 1, wherein the chemical composition further includes, by mass %, V: not more than 0.30%.

3. The method according to claim 1, wherein the chemical composition further includes, by mass %, one or both of W: not more than 1.0% and Mo: not more than 0.5%.

4. The method according to claim 2, wherein the chemical composition further includes, by mass %, one or both of W: not more than 1.0% and Mo: not more than 0.5%.

5. The method according to claim 1, wherein the chemical composition further includes, by mass %, not more than 1.0% in total of one or more of Sb, Cu, Ni, Sn, Cr, Ca, REM, Mg, Se, Te, Po, As, Bi, Ge, Pb, Ga, In, Tl, Zn, Cd, Hg, Ag, Au, Pd, Pt, Co, Rh, Ir, Ru, Os, Te, Re, Ta, Be and Sr.

6. A hot rolled steel sheet with high strength manufactured by the method described in claim 1, the hot rolled steel sheet comprising a ferrite phase with an area percentage of not less than 95%, the ferrite phase having an average crystal grain diameter of not more than 8 μm, the crystal grains of the ferrite phase having an aspect ratio of not more than 3.5, the crystal grains of the ferrite phase having an average carbide particle diameter of less than 10 nm, the hot rolled steel sheet having a tensile strength of not less than 850 MPa.

7. The hot rolled steel sheet according to claim 6, further comprising a plating layer on a surface of the steel sheet.

8. The hot rolled steel sheet according to claim 7, wherein the plating layer is a zinc coating.

9. The hot rolled steel sheet according to claim 7, wherein the plating layer is an alloyed zinc coating.

10. The hot rolled steel sheet according to claim 6, wherein the hot rolled steel sheet has an anisotropy in tensile strength of not more than 30 MPa, the anisotropy in tensile strength being defined as a difference in absolute value obtained by subtracting the tensile strength in L direction from the tensile strength in C direction.

11. The hot rolled steel sheet according to claim 6, wherein the hot rolled steel sheet has an anisotropy in total elongation of not more than 2%, the anisotropy in total elongation being defined as a difference in absolute value obtained by subtracting the total elongation in L direction from the total elongation in C direction.

12. The method according to claim 2, wherein the chemical composition further includes, by mass %, not more than 1.0% in total of one or more of Sb, Cu, Ni, Sn, Cr, Ca, REM, Mg, Se, Te, Po, As, Bi, Ge, Pb, Ga, In, Tl, Zn, Cd, Hg, Ag, Au, Pd, Pt, Co, Rh, Ir, Ru, Os, Tc, Re, Ta, Be and Sr.

13. The method according to claim 3, wherein the chemical composition further includes, by mass %, not more than 1.0% in total of one or more of Sb, Cu, Ni, Sn, Cr, Ca, REM, Mg, Se, Te, Po, As, Bi, Ge, Pb, Ga, In, Tl, Zn, Cd, Hg, Ag, Au, Pd, Pt, Co, Rh, Ir, Ru, Os, Tc, Re, Ta, Be and Sr.

14. The method according to claim 4, wherein the chemical composition further includes, by mass %, not more than 1.0% in total of one or more of Sb, Cu, Ni, Sn, Cr, Ca, REM, Mg, Se, Te, Po, As, Bi, Ge, Pb, Ga, In, Tl, Zn, Cd, Hg, Ag, Au, Pd, Pt, Co, Rh, Ir, Ru, Os, Tc, Re, Ta, Be and Sr.

15. The hot rolled steel sheet according to claim 6, wherein the chemical composition further includes, by mass %, V: not more than 0.30%.

16. The hot rolled steel sheet according to claim 6, wherein the chemical composition further includes, by mass %, one or both of W: not more than 1.0% and Mo: not more than 0.5%.

17. The hot rolled steel sheet according to claim 15, wherein the chemical composition further includes, by mass %, one or both of W: not more than 1.0% and Mo: not more than 0.5%.

18. The hot rolled steel sheet according to claim 6, wherein the chemical composition further includes, by mass%, not more than 1.0% in total of one or more of Sb, Cu, Ni, Sn, Cr, Ca, REM, Mg, Se, Te, Po, As, Bi, Ge, Pb, Ga, In, Ti, Zn, Cd, Hg, Ag, Au, Pd, Pt, Co, Rh, Ir, Ru, Os, Tc, Re, Ta, Be and Sr.

19. The hot rolled steel sheet according to claim 15, wherein the chemical composition further includes, by mass %, not more than 1.0% in total of one or more of Sb, Cu, Ni, Sn, Cr, Ca, REM, Mg, Se, Te, Po, As, Bi, Ge, Pb, Ga, In, Tl, Zn, Cd, Hg, Ag, Au, Pd, Pt, Co, Rh, Ir, Ru, Os, Te, Re, Ta, Be and Sr.

20. The hot rolled steel sheet according to claim 16, wherein the chemical composition further includes, by mass %, not more than 1.0% in total of one or more of Sb, Cu, Ni, Sn, Cr, Ca, REM, Mg, Se, Te, Po, As, Bi, Ge, Pb, Ga, In, Tl, Zn, Cd, Hg, Ag, Au, Pd, Pt, Co, Rh, Ir, Ru, Os, Tc, Re, Ta, Be and Sr.

21. The hot rolled steel sheet according to claim 17, wherein the chemical composition further includes, by mass %, not more than 1.0% in total of one or more of Sb, Cu, Ni, Sn, Cr, Ca, REM, Mg, Se, Te, Po, As, Bi, Ge, Pb, Ga, In, Tl, Zn, Cd, Hg, Ag, Au, Pd, Pt, Co, Rh, Ir, Ru, Os, Te, Re, Ta, Be and Sr.

* * * * *

UNITED STATES PATENT AND TRADEMARK OFFICE
CERTIFICATE OF CORRECTION

| | | |
|---|---|---|
| PATENT NO. | : 9,534,271 B2 | Page 1 of 1 |
| APPLICATION NO. | : 14/365392 | |
| DATED | : January 3, 2017 | |
| INVENTOR(S) | : Kosaka et al. | |

It is certified that error appears in the above-identified patent and that said Letters Patent is hereby corrected as shown below:

In the Specification

In Column 10
At Line 22, please change "648)" to -- /48) --.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*